May 3, 1932.  H. HUEBER ET AL  1,856,416
WINDSHIELD WIPER
Filed March 20, 1930

Inventors
Henry Hueber &
Erwin C. Horton
by Barton A. Beau Jr
Attorney

Patented May 3, 1932

1,856,416

UNITED STATES PATENT OFFICE

HENRY HUEBER, OF BUFFALO, AND ERWIN C. HORTON, OF HAMBURG, NEW YORK, ASSIGNORS TO TRICO PRODUCTS CORPORATION, OF BUFFALO, NEW YORK

WINDSHIELD WIPER

Application filed March 20, 1930. Serial No. 437,574.

This invention relates to a windshield cleaner and more especially to a tandem arrangement of wipers in which a main wiper operated directly from a motor is coupled to an auxiliary wiper for imparting a like movement thereto, the primary object of the invention being to simplify the structural features whereby the auxiliary wiper and its coupling element may be manufactured in an economical manner and readily assembled on a windshield for use either with an already installed cleaner or one installed simultaneously therewith.

More particularly, this invention contemplates a better mounting for the auxiliary wiper in that its supporting shaft is given journal support at each end to resist and withstand the strains and stresses incidental to the wiping operation; and also an improved coupler design for connecting the main and auxiliary wipers together.

The subject matter herein disclosed constitutes an improvement on the invention disclosed in the patent on an auxiliary windshield cleaner of John R. Oishei granted June 24, 1930 under No. 1,768,329.

Figure 1:
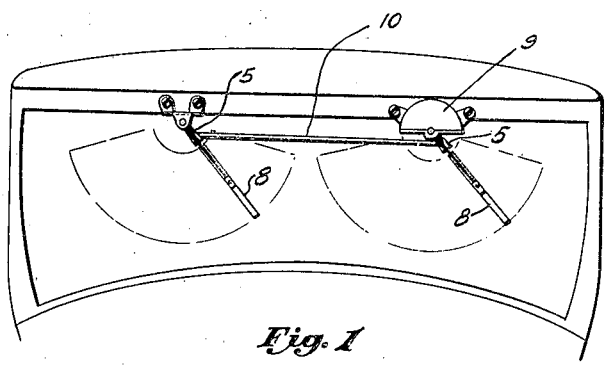
Fig. 1 illustrates a windshield equipped with an auxiliary windshield cleaner embodying the present improvements.
Figure 3:
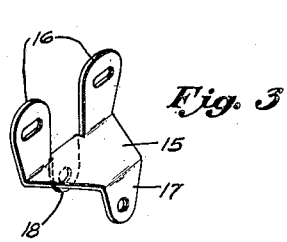
Fig. 3 is a detail perspective view of the mounting bracket for the auxiliary cleaner or wiper.

In the aforementioned patent of John R. Oishei there is depicted a coupling link carrying at each end a stirrup forming a part of a special wiper arm assembly more clearly set forth in the patent to the said John R. Oishei No. 1,674,657. This assembly provides for readily detachable wiper arm mounting and has herein been depicted in a modified form with the numeral 1 designating the wiper arm, 2 its pintle pivotally engaging in a diametral bearing formed in the shaft 3, and 4 a coil spring which encircles the upper end of the wiper arm and is held under compression by the stirrup 5, the latter being suspended at one end from a seat 6 provided in the shaft 3, and at its opposite end engaged about the wiper arm immediately beneath the spring 4 and in supporting relation therewith. The spring 4 being held under tension or compression serves to secure the pintle 2 against unauthorized displacement and concurrently urges the wiper arm 1 toward the windshield glass 7 whereby the wiper blade 8 is urged into the desired wiping engagement with the glass.

Figure 2:
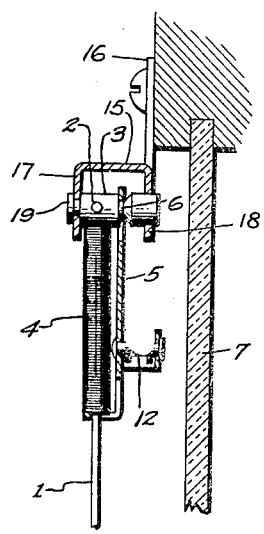
Fig. 2 is a vertical fragmentary sectional view through the mounting bracket of the auxiliary cleaner, portions being shown in elevation.
Figure 4:
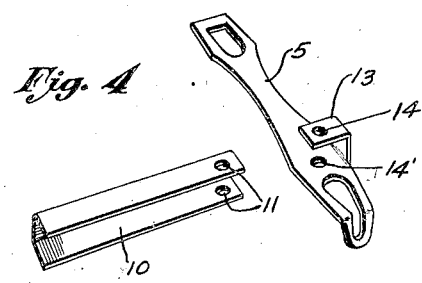
Fig. 4 is a disassembled perspective view of the connecting link (broken away) and one of its attaching stirrups.

In Fig. 1 the numeral 9 designates the windshield cleaner motor which serves to reciprocate or oscillate its wiper 8, and the stirrup 5 of its spring arm assembly is connected to the corresponding part of the auxiliary wiper assembly by means of a connecting link 10 which is preferably disposed in an inverted position. This link is preferably of a channel bar formation for lightness, strength and simplicity, and has its opposite ends apertured, as indicated at 11, for receiving a connecting pivot 12 carried by the respective stirrup 5. Each stirrup is provided with an overhanging bearing 13 preferably struck from the same stock piece and having its overlying or overhanging portion formed with an aperture 14 in registry with a like aperture 14′ formed in the body of the stirrup for receiving the pivot pin 12. The overhanging bearing part 13 is spaced sufficiently from the body of the stirrup so as to permit the free introduction of the adjacent end of the coupling link 10 therebetween, as is clearly shown in Fig. 2. The presence of the overhanging bearing 13 provides a solid and substantial support for the pin 12. The coupling link 10 has a broad bearing on the pivot pin, thereby providing a pivotal connection between the coupling link and the stirrup which will tend to thwart lateral thrusts and twisting stresses on the pin and stirrup which might otherwise result in injury to the assembly during operation.

The auxiliary shaft 3 is likewise given substantial support by the specially constructed bracket 15 which has a pair of attaching ears 16 by which the bracket may be secured to a desired support, such as the header bar of the windshield. The body of the bracket is thence extended horizontally outwards, with its outer, marginal portion downturned to provide a journal bearing 17. That part of the bracket stock material between the ears 16 is preferably turned downwardly to form a second journal bearing 18 in opposition to the journal bearing 17 and apertured to rotatably support the opposite ends of the auxiliary wiper shaft 3. Preferably the shaft is permanently secured in one of its journal supports (17 in the present showing) by means of a retaining flange or part 19, while the opposite end of the shaft is inserted in its bearing support 18 such as through a springing apart of the two supports 17 and 18.

In operation, the main cleaner 9 will oscillate its wiper 8 and, through the coupling bar or link 10, this motion will be imparted to the auxiliary wiper arm 1 which oscillates with the shaft 3. The shaft being journaled at each end is given sturdy support by the bracket 15.

The improved assembly provides a substantial and durable construction for the otherwise frail and lightly constructed auxiliary cleaner in which the auxiliary shaft is given substantial support and the coupling unit rendered more efficient and practical by reason of the improved connection between the coupling link and the respective stirrup members.

What is claimed is:

1. An auxiliary windshield cleaner comprising a stirrup having an opening in one end to receiver a wiper supporting shaft and an opening in its opposite end to engage about a wiper carrying arm, the intermediate portion of said stirrup having an overhanging bearing provided with a part opposed to said intermediate portion, said intermediate portion and overhanging part being provided with means for connecting an interposed coupling link.

2. An auxiliary windshield cleaner comprising a mounting bracket formed from sheet metal and having a pair of attaching ears, the intermediate portion between said ears being downturned to form a shaft support, said bracket having a depending portion in opposition to the intermediate portion to form a shaft support, said shaft supports being provided with journal bearings, a shaft journaled in one bearing and having detachable support in the companion bearing, said supports being relatively separable by springing apart the same, said shaft intermediate said supports being provided with means for mounting a wiper carrying arm.

3. An auxiliary windshield cleaner comprising a pliable mounting bracket having spaced ears, an angularly extending support, the outer marginal portion of the support being downturned to provide a bearing support, and the portion between said ears being downturned, said downturned portions being opposed and formed with journal bearings, a shaft having its opposite ends journaled in the bearings, one end of the shaft being permanently secured in its bearing for rotation and the opposite end being detachably engaged in the companion bearing upon relative separation of said opposed downturned portions, and a wiper arm connected to the shaft between the bracket bearings.

4. An auxiliary windshield cleaner comprising a pliable mounting bracket having opposed bearings and means for mounting the bracket, a shaft having its opposite ends supported in the bracket bearings, a wiper arm connected to the shaft between the bracket bearings, said shaft having a seat between the bracket bearings, a stirrup suspended from the seat engaging the wiper arm at a point spaced therefrom, a spring carried by the shaft and interposed and compressed between the stirrup and the shaft, and a coupling link connected to the stirrup, one end of the shaft being disengageably mounted in its bracket bearing to permit of the mounting and demounting of said stirrup over the end of the shaft.

HENRY HUEBER.
ERWIN C. HORTON.